UNITED STATES PATENT OFFICE.

CASIMIR JAMES HEAD AND ROLAND CECIL WILD, OF LONDON, ENGLAND.

METHOD OF TREATING TELLURIDE ORES.

SPECIFICATION forming part of Letters Patent No. 660,013, dated October 16, 1900.

Original application filed May 8, 1900, Serial No. 15,954. Divided and this application filed August 25, 1900. Serial No. 28,070. (No specimens.)

*To all whom it may concern:*

Be it known that we, CASIMIR JAMES HEAD and ROLAND CECIL WILD, subjects of the Queen of Great Britain and Ireland, residing at London, England, have invented a new and Improved Method for the Treatment of Telluride Ores, (for which we made application for a patent in the United States on May 8, 1900, and prior to such application in Great Britain, under No. 23,911, bearing date November 30, 1899,) of which the following is a specification.

This invention relates to the treatment of ores containing tellurium or tellurides, which ores up to the present do not appear to have been treated for the extraction of the tellurium in a cheap and commercial manner. As such ores frequently carry considerable quantities of the precious metals combined with the tellurium, the extraction of which precious metals is difficult except by wasteful processes, so long as the tellurium remains present in the ore during such treatment, we have found that our process for the extraction and ultimate precipitation and recovery of the tellurium renders such ores more adaptable after such treatment to the extraction of the precious metals by amalgamation or other known cheap and simple modes for the extraction and recovery of such precious metals.

To carry our process into effect, the ore or material to be treated is ground or crushed to a suitable state of division and is then lixiviated or digested with a solution of carbonate of soda or potash. This solution is preferably of about a strength of five per cent. of the alkali salt and requires from two to six hours' digestion with the ores, according to the quantity of tellurium present, which is determined by a previous laboratory test for any specific ore. The rapidity of the reaction with the tellurium is increased by the solution being warmed, say, with exhaust-steam, and agitation during digestion is also useful in case of high-grade ore. The reaction between the tellurium and the solution may be represented as follows: In many ores the tellurium is found as a telluride of gold ($AuTe_3$) or of silver in a feldspar gangue or matrix—

$$4AuTe_3 + 6Na_2CO_3 = 9NaTe + 3NaTeO_2 + 6CO_2 + 4Au.$$

The carbonate of soda splits up the telluride, dissolving the tellurium, probably as sodium telluride and sodium tellurite. The tellurium is by this means readily dissolved out of the ore. The liquor containing it, being drawn off by suitable means, can be treated for the precipitation of the tellurium after acidifying by passing sulfurous - anhydrid (sulfur dioxid) gas through the liquor, or by the addition of protochlorid of tin, or by other known reagents serving to precipitate tellurium from an acid solution; but in the case of precipitating the tellurium from an alkaline solution the reducing-sugars may be employed as the precipitant. The ores thus treated, if auriferous or argentiferous, are thereby rendered much more amenable to the ordinary processes of amalgamation and to other known processes for the extraction and recovery of the precious metals with higher percentage of economy in such processes, by reason of the preliminary extraction of the tellurium, as before described.

Having now described this invention, what we claim, and desire to secure by Letters Patent, is—

1. A process for the extraction of tellurium from telluric ores, consisting of the lixiviation and digestion of the ores for a lengthened period of time (two to six hours) in a solution, containing about five per cent. of an alkaline carbonate; the removal of the filtrate; the acidifying of the filtrate and the precipitation of the tellurium from the filtrate by known means, substantially as described.

2. A process for the extraction of tellurium from telluride auriferous ores, and the preparation thereby of said ores for the better extraction of the precious metal therefrom consisting of a lixiviation and digestion of the said ores in a solution, containing about five per cent. of carbonate of sodium or potassium for a lengthened period of two to six hours; the withdrawal of the filtrate, and the recovery of the tellurium from the solution, substantially as described.

In witness whereof we have hereunto set our hands in presence of two witnesses.

<div style="text-align:right">CASIMIR JAMES HEAD.<br/>ROLAND CECIL WILD.</div>

Witnesses:
RICHARD A. HOFFMANN,
WILLIAM CORNHILL.